US012674433B2

(12) United States Patent
Adachi et al.

(10) Patent No.: US 12,674,433 B2

(45) Date of Patent: Jul. 7, 2026

(54) INTERNAL COMBUSTION ENGINE

(71) Applicant: TOYOTA JIDOSHA KABUSHIKI KAISHA, Toyota (JP)

(72) Inventors: Hiroaki Adachi, Kanagawa-ken (JP); Shunsuke Fushiki, Susono (JP); Tadashi Okuda, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/055,708

(22) Filed: Feb. 18, 2025

(65) Prior Publication Data

US 2026/0028956 A1 Jan. 29, 2026

(30) Foreign Application Priority Data

Jul. 26, 2024 (JP) ................................ 2024-120812

(51) Int. Cl.
*F02N 19/10* (2010.01)
*F02M 31/125* (2006.01)

(52) U.S. Cl.
CPC .......... *F02N 19/10* (2013.01); *F02M 31/125* (2013.01)

(58) Field of Classification Search
CPC ........ F02N 19/10; F02M 31/125; Y02T 10/12
See application file for complete search history.

(56) References Cited

U.S. PATENT DOCUMENTS 11,937,358 B1 * 3/2024 Okuda .................. H05B 6/101

FOREIGN PATENT DOCUMENTS

| | | | | | |
|---|---|---|---|---|---|
| JP | 2001-020738 | A | | 1/2001 | |
| JP | 2003074450 | A | * | 3/2003 | |
| JP | 2004270478 | A | * | 9/2004 | |
| JP | 2005-171886 | A | | 6/2005 | |
| JP | 2019044703 | A | * | 3/2019 | |
| JP | 6579171 | B2 | * | 9/2019 | |
| KR | 20040029212 | A | * | 4/2004 | |
| KR | 2015000555 | A | * | 1/2015 | |
| KR | 20150130895 | A | * | 11/2015 | ............. F02B 33/34 |

* cited by examiner

*Primary Examiner* — Hung Q Nguyen
(74) *Attorney, Agent, or Firm* — SoraIP, Inc.

(57) ABSTRACT

The internal combustion engine includes a cylinder block. The cylinder block includes a cylinder liner having an outer peripheral surface, an opposing wall opposed to the outer peripheral surface, a water jacket defined by the outer peripheral surface and the opposing wall, and a heater accommodated in the water jacket in contact with the outer peripheral surface.

5 Claims, 3 Drawing Sheets

INTERNAL COMBUSTION ENGINE

CROSS-REFERENCE TO RELATED APPLICATION

This application claims priority to Japanese Patent Application No. 2024-120812 filed on Jul. 26, 2024, incorporated herein by reference in its entirety.

BACKGROUND

1. Technical Field

The present disclosure relates to an internal combustion engine.

2. Description of Related Art

Japanese Unexamined Patent Application Publication No. 2005-171886 (JP 2005-171886 A) discloses an internal combustion engine including a heater that heats a bore wall of a cylinder block.

SUMMARY

The internal combustion engine described in JP 2005-171886 A is provided with a space that accommodates the heater in the bore wall of the cylinder block. Therefore, the strength of the cylinder block decreases.

In order to address the above issue, an aspect provides an internal combustion engine including a cylinder block. The cylinder block includes: a cylinder liner having an outer peripheral surface; an opposing wall that opposes the outer peripheral surface; a water jacket defined by the outer peripheral surface and the opposing wall; and a heater housed in the water jacket in contact with the outer peripheral surface.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of an internal combustion engine will be described with reference to the drawings.

Overall Configuration of the Internal Combustion Engine

Figure 1:
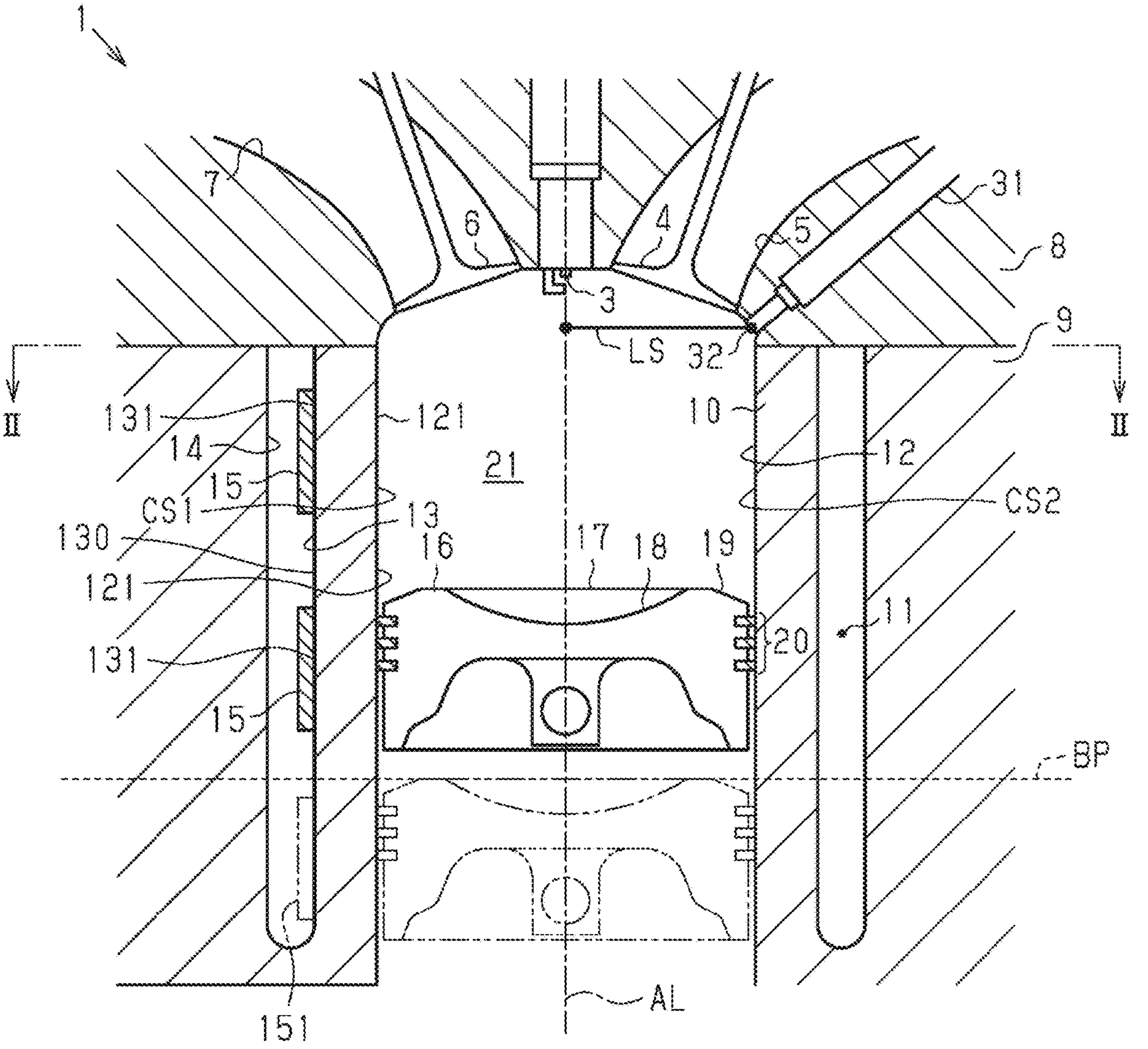
FIG. 1 is a cross-sectional view of a cylinder block.

As shown in FIG. 1, the internal combustion engine 1 includes a cylinder block 9, a cylinder head 8, and a piston 16. The cylinder block 9 includes a cylinder liner 10. The piston 16 is housed inside the cylinder liner 10. The internal combustion engine 1 includes a combustion chamber 21. The combustion chamber 21 is defined by the inner peripheral surface 12 of the cylinder liner 10, the piston 16, and the cylinder head 8.

The cylinder head 8 is attached to the cylinder block 9. The internal combustion engine 1 includes an injector 31 and a spark plug 3. The spark plug 3 is accommodated in a central lower portion of the cylinder head 8.

Piston

The piston 16 comprises three piston rings 20. The piston 16 reciprocates to change the volume of the combustion chamber 21. The top dead center is the position of the piston when the volume of the combustion chamber 21 is minimized. The bottom dead center is the position of the piston when the volume of the combustion chamber 21 is maximized.

The top of the piston 16 includes a concave surface 18, a top surface 17, and a tapered surface 19. The concave surface 18 is a curved surface which is located at the center of the top of the piston 16 and is recessed toward the other side of the spark plug 3 along the axis AL of the piston 16. The axis AL of the piston 16 is an imaginary line that passes through the center of the top of the piston 16 and extends in the reciprocating direction of the piston 16. The top surface 17 is an annular plane that is continuous with the concave surface 18 and surrounds the concave surface 18. The top surface 17 is perpendicular to the axis AL of the piston 16. The tapered surface 19 is an annular curved surface that is continuous with the top surface 17 and surrounds the top surface 17.

The cylinder head 8 includes an intake port 5 and an exhaust port 7. The intake port 5 introduces intake air into the combustion chamber 21. The intake port 5 includes an intake valve 4 at an opening portion to the combustion chamber 21. The intake valve 4 opens in the intake stroke of the internal combustion engine 1, thereby causing the combustion chamber 21 and the intake port 5 to communicate with each other.

The exhaust port 7 discharges the exhaust gas from the combustion chamber 21. The exhaust port 7 includes an exhaust valve 6 at an opening portion to the combustion chamber 21. The exhaust valve 6 opens in the exhaust stroke of the internal combustion engine 1, thereby causing the combustion chamber 21 and the exhaust port 7 to communicate with each other. The internal combustion engine 1 includes two intake valves 4 and two exhaust valves 6. FIG. 1 shows only one intake valve 4 and one exhaust valve 6, respectively.

Injector

Figure 2:
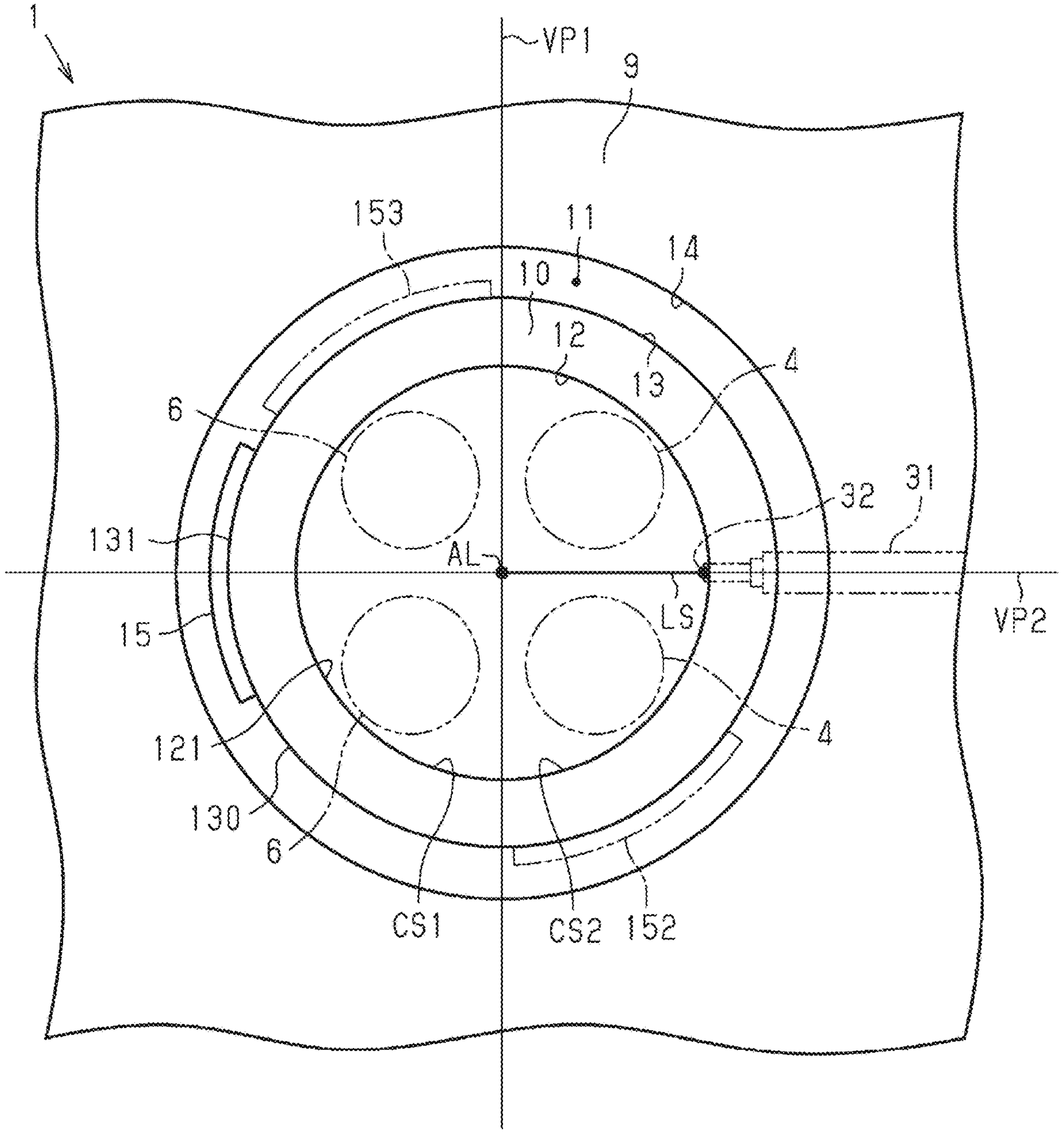
FIG. 2 is a cross-sectional view taken along II-II line of FIG. 1.

As shown in FIG. 2, the injector 31 is accommodated in the cylinder head 8 in a portion between the two intake valves 4. The injector 31 includes an injection port 32 at the tip of the injector 31. The injector 31 is a direct injection type injector that injects fuel from the injection port 32 toward the inside of the cylinder liner 10, that is, toward the combustion chamber 21.

Water Jacket

The cylinder block 9 includes a water jacket 11 and two heaters 15. The cylinder block 9 includes an opposing wall 14 facing the outer peripheral surface 13 of the cylinder liner 10. The opposing wall 14 is provided on the outer side in the radial direction of the piston 16 with respect to the outer peripheral surface 13 of the cylinder liner 10.

The water jacket 11 is a passage of coolant for cooling the cylinder block 9. The water jacket 11 is defined by an outer peripheral surface 13 and an opposing wall 14 of the cylinder liner 10. The water jacket 11 and the opposing wall 14 surround the outer peripheral surface 13 of the cylinder liner 10 over the entire circumferential direction of the piston 16.

Heater

The two heaters 15 are accommodated in the water jacket 11 at intervals along the axis AL. An example of the heater 15 is an electric heater. An example of the electric heater is a heater that generates heat by passing a current through a heating wire. The heater 15 is, for example, a sheet-shaped heater in surface contact with the outer peripheral surface 13. The internal combustion engine 1 includes a power supply for supplying electric power to the heater 15.

The heater 15 is provided so as not to block the flow path of the coolant in the water jacket 11. For example, the thickness of the heater 15 is thinner than the distance between the outer peripheral surface 13 of the cylinder liner 10 and the opposing wall 14. Therefore, there is a gap through which the coolant passes between the heater 15 and the opposing wall 14. Therefore, the flow path resistance when the coolant flows in the water jacket 11 is small. Further, since the heater 15 is not in contact with the opposing wall 14, the heat of the heater 15 is hardly transmitted to the opposing wall 14, and is easily transmitted to the outer peripheral surface 13 of the cylinder liner 10.

Figure 3:
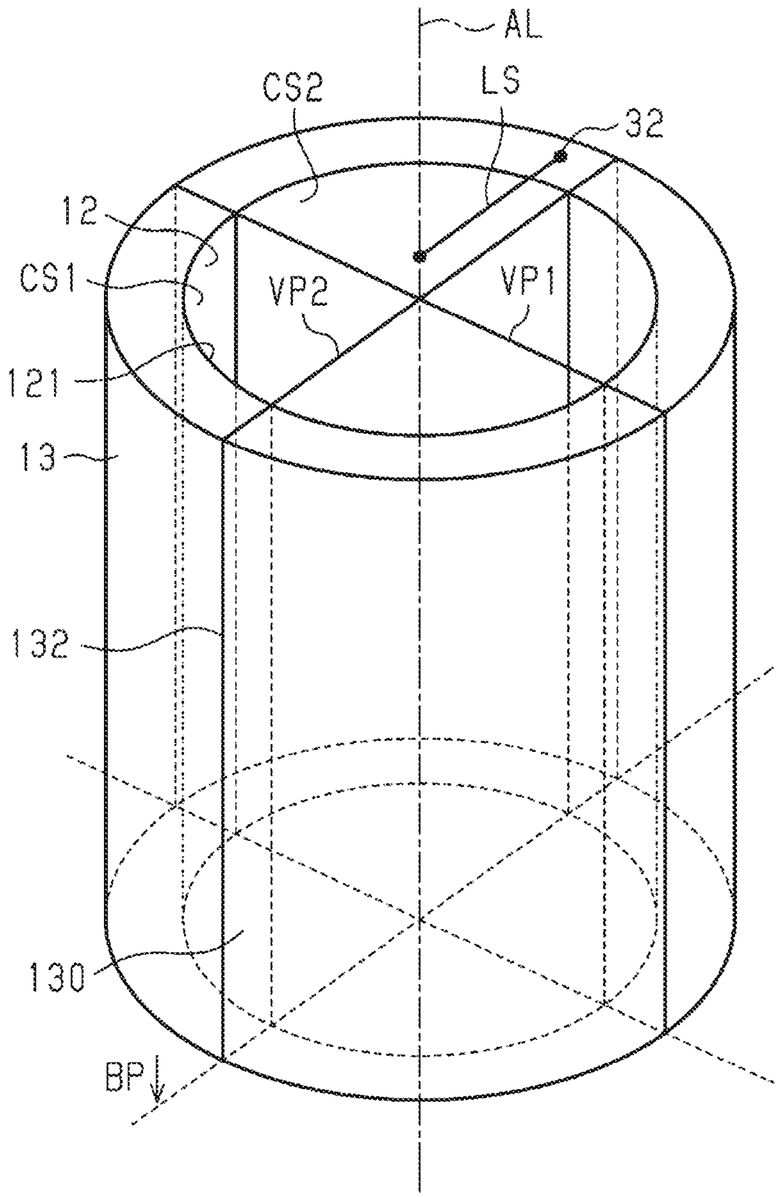
FIG. 3 is a schematic diagram illustrating a positional relationship between an axis of a piston, a first imaginary plane, and a second imaginary plane.

As shown in FIGS. 1 to 3, the direction along the axis AL of the piston 16 is referred to as the axis AL direction. In the axis AL, the position of the top surface 17 when the piston 16 is located at the bottom dead center is referred to as the bottom dead center position BP. A line segment connecting the injection port 32 from the axis AL of the piston 16 is referred to as an imaginary line segment LS. An imaginary plane including the axis AL of the piston 16 and intersecting perpendicularly with the imaginary line segment LS is referred to as a first imaginary plane VP1. An imaginary plane including the axis AL of the piston 16 and perpendicular to the first imaginary plane VP1 is referred to as a second imaginary plane VP2.

Fuel Adhesion Surface and Contact Surface

The inner peripheral surface 12 of the cylinder liner 10 includes a fuel adhesion surface 121 to which the liquid fuel injected from the injector 31 adheres. In the inner peripheral surface 12 of the cylinder liner 10, the fuel adhesion surface 121 is more likely to adhere to liquid fuel than other portions. An example of the fuel adhesion surface 121 is a portion of the inner peripheral surface 12 that satisfies at least the condition (A) among the conditions (A) and (B) described below. It is desirable that the fuel adhesion surface 121 further satisfies the condition (A).

(A) In the axis AL, it is located closer to the injection port 32 of the injector 31 than the bottom dead center position BP.

(A) Among the two semi-cylindrical surfaces CS1, CS2 obtained by equally dividing the inner peripheral surface 12 by the first imaginary plane VP1, a part corresponding to the semi-cylindrical surface CS1 located on the other side of the injection port 32 with respect to the axis AL of the piston 16.

Hereinafter, a portion of the outer peripheral surface 13 of the cylinder liner 10 located on the opposite side of the fuel adhesion surface 121 in the radial direction of the piston 16 will be referred to as an opposite surface 130. Heat on the opposite surface 130 is likely to be transferred to the fuel adhesion surface 121. Thus, heating the opposite surface 130 increases the temperature of the fuel adhesion surface 121.

The contact surface 131 is a portion of the outer peripheral surface 13 of the cylinder liner 10 where the heater 15 and the cylinder liner 10 are in contact with each other. The contact surface 131 includes an opposite surface 130. If the contact surface 131 includes an opposite surface 130, the contact surface 131 may be only partially opposite surface 130 or all opposite surfaces 130. The contact surface 131 preferably includes an intersection line 132 between the second imaginary plane VP2 and the opposite surface 130.

Operation and Effect of the Present Embodiment (1) The outer peripheral surface 13 of the cylinder liner 10 is heated by the heater 15 to increase the temperature. Therefore, the liquid fuel adhering to the inner peripheral surface 12 of the cylinder liner 10 can be vaporized. The heater 15 is housed in the water jacket 11. Therefore, the strength of the cylinder block 9 is less likely to decrease as compared with a configuration in which a space for accommodating the heater 15 is separately provided in the cylinder block 9.

(2) Since the contact surface 131 includes the opposite surface 130, the temperature of the fuel adhesion surface 121 increases due to the heat of the heater 15. As a 30 result, more fuel can be vaporized.

Example of Change

The present embodiment can be modified and implemented as follows. The present embodiment and modification examples described below may be carried out in combination of each other within a technically consistent range.

The internal combustion engine 1 may include a port injection type injector that injects fuel into the intake port 5 in place of the direct injection type injector 31 or in addition to the direct injection type injector 31. The fuel injected from the port injection injector is mixed with the air flowing through the intake port 5 and then introduced into the combustion chamber 21. A portion of the fuel introduced into the combustion chamber 21 adheres to the inner peripheral surface 12 of the cylinder liner 10 in a liquid state. The liquid fuel injected from the port injection type injector and attached to the inner peripheral surface 12 can be vaporized by heating by the heater 15.

The contact surface 131 between the heater and the cylinder liner 10 may not include the intersection line 132. The heater 153 shown in FIG. 2 is an example of a heater in this configuration.

The fuel adhesion surface 121 may be a semi-cylindrical surface CS2 positioned closer to the injection port 32 with respect to the axis AL of the piston 16, out of two semi-cylindrical surfaces CS1, CS2 obtained by equally dividing the inner peripheral surface 12 by the first imaginary plane VP1. The heater 152 shown in FIG. 2 is an example of a heater in this configuration.

The number of the heaters 15 may be one or three or more. The heating method of the heater 15 may be an induction heating method in which heat is generated by an alternating magnetic field, a dielectric heating method in which heat is generated by a high-frequency electric field, or a laser heating method in which heat is generated by irradiating atomic motion with constant light.

The fuel adhesion surface 121 may not be a part of the inner peripheral surface 12 located closer to the injection port 32 of the injector 31 in the axis AL of the piston 16 than the bottom dead center position BP. The heater 151 shown in FIG. 1 is an example of a heater in this configuration.

What is claimed is:

1. An internal combustion engine including a cylinder block, wherein the cylinder block includes:

a cylinder liner having an outer peripheral surface;

an opposing wall that opposes the outer peripheral surface;

a water jacket defined by the outer peripheral surface and the opposing wall; and a heater housed in the water jacket in contact with the outer peripheral surface.

2. The internal combustion engine according to claim 1, comprising:

a piston accommodated in the cylinder liner; and an injector that injects fuel, wherein:

an inner peripheral surface of the cylinder liner includes a fuel adhesion surface to which liquid fuel injected from the injector adheres; and a contact surface as a portion of the outer peripheral surface in contact with the heater includes an opposite surface as a portion of the outer peripheral surface that is located on an opposite side of the fuel adhesion surface in a radial direction of the piston.

3. The internal combustion engine according to claim 2, wherein:

the injector is a direct injection injector that injects fuel into the cylinder liner; and the fuel adhesion surface is a portion of the inner peripheral surface that is located closer to an injection port of the injector in a direction along an axis of the piston than a top surface of the piston located at a bottom dead center.

4. The internal combustion engine according to claim 3, wherein when a line segment orthogonal to the axis of the piston and connecting the injection port of the injector and the axis is defined as an imaginary line segment, and a plane including the axis and orthogonal to the imaginary line segment is a first imaginary plane, the fuel adhesion surface is a semi-cylindrical surface located on an opposite side of the injection port with reference to the axis, of two semi-cylindrical surfaces obtained by equally dividing the inner peripheral surface by the first imaginary plane.

5. The internal combustion engine according to claim 4, wherein when a plane including the imaginary line segment and orthogonal to the first imaginary plane is defined as a second imaginary plane, the contact surface includes an intersection line between the second imaginary plane and the opposite surface.

* * * * *